United States Patent [19]

Matsushita et al.

[11] Patent Number: 4,486,495
[45] Date of Patent: Dec. 4, 1984

[54] METHOD FOR MANUFACTURING A RUBBER SHEET WHICH IS ELECTRICALLY INSULATING AND THERMALLY RADIATING AND RUBBER SHEETS MADE THEREFROM

[75] Inventors: Takao Matsushita; Koji Shimizu, both of Chiba, Japan

[73] Assignee: Toray Silicone Co., Ltd., Tokyo, Japan

[21] Appl. No.: 503,911

[22] Filed: Jun. 13, 1983

[30] Foreign Application Priority Data

Jun. 14, 1982 [JP] Japan ................... 57-101895

[51] Int. Cl.³ .................. B05D 3/02; B32B 7/00; D03D 3/00; D04B 1/00
[52] U.S. Cl. .................... 428/266; 427/387; 427/389.8; 427/393.6; 428/268; 428/271; 428/273; 428/429; 428/443
[58] Field of Search ............ 252/567, 573; 427/82, 427/387, 389.8, 393.6; 428/268, 266, 271, 273, 429, 443, 447

[56] References Cited

U.S. PATENT DOCUMENTS 3,161,614 12/1964 Brown et al. ............ 252/573 X
4,265,775 5/1981 Aakalu et al. ............ 252/573

FOREIGN PATENT DOCUMENTS 22054 5/1983 Japan .
22055 5/1983 Japan .
22056 5/1983 Japan .
849885 9/1960 United Kingdom ........ 252/573

Primary Examiner—Michael R. Lusignan
Attorney, Agent, or Firm—Roger H. Borrousch

[57] ABSTRACT

A silicone rubber sheet which is both electrically insulating and thermally radiating is prepared by coating a network insulating material, such as glass fabric, with a fluid silicone rubber composition of an aliphatically unsaturated polyorganosiloxane, a polyorganohydrogensiloxane, alumina powder, and a platinum-group compound catalyst.

10 Claims, No Drawings

METHOD FOR MANUFACTURING A RUBBER SHEET WHICH IS ELECTRICALLY INSULATING AND THERMALLY RADIATING AND RUBBER SHEETS MADE THEREFROM

BACKGROUND OF THE INVENTION

1. Field of the Invention

This invention relates to a method for manufacturing a rubber sheet having electrically insulating properties and thermally radiating properties.

2. Description of the Prior Art

Heat-producing electronic components such as power transistors or thyristors usually generate heat in their operation. As a result, when these electronic components are used for a long period of time, their properties deteriorate due to the heat and they occasionally fail. For this reason, an electric-insulating and radiating sheet which exhibits both electric insulation properties and thermal conductivity is placed between the above-mentioned heat-producing electronic parts and constructed with radiator fins (or metal radiator plates) in order to provide the heat-producing electronic part in such a way that the heat generated will be radiated.

Conventional radiating sheets are usually mica or a polyester film coated with grease. However, the grease can evaporate and is degraded in long-term use with the result that its radiating characteristics tend to degrade and it causes complications in operation. In addition, mica and polyimide films are hard and their surfaces are not adhesive. These are the drawbacks of conventional radiating sheets.

It is known that a silicone rubber radiating sheet alone has recently been used without the use of grease. However, this thin silicone rubber radiating sheet exhibited the drawback of low mechanical strength with the result that it presented problems such as tearing during installation. For this reason, the use of glass cloth has been proposed to reinforce the above-mentioned sheet to give high reliability. A conventional method for the production of an insulating and radiating rubber sheet reinforced with such a network insulating material (glass cloth) is to dip the network material into a nonfluid (solid) peroxide-vulcanized silicone rubber compound dissolved in a large amount of solvent and the compound cured to a radiating rubber. However, the nonfluid rubber compound is not very soluble and a long time is required for dissolution and the solid component concentration in the resulting solution is low. Due to this, the number of immersions must be increased and the process becomes very complicated. Furthermore, this process poses safety and hygiene problems due to the use of a large amount of an organic solvent.

SUMMARY OF THE INVENTION

This invention provides a new production method which does not exhibit the above-mentioned drawbacks and problems. A fluid addition reaction-curable silicone rubber composition is directly coated on a network insulating material and subsequently cured in order to effectively produce an electrically insulating and a thermally radiating rubber sheet which exhibits high strength.

This invention relates to a method for manufacturing a rubber sheet which is electrically insulating and thermally radiating, comprising coating a network insulating material with a fluid silicone rubber composition and then curing said composition, where the fluid silicone rubber composition consists essentially of (a) 100 parts by weight of a polyorganosiloxane having a viscosity at 25° C. of from 0.1 to 100 Pa·s and having an average unit formula $$R_a R'_b SiO_{(4-a-b)/2}$$

wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.0005 to 0.1, and the sum of a+b has a value from 1.91 to 2.06, (b) a polyorganohydrogensiloxane having a viscosity at 25° C. of 0.0007 to 5 Pa·s and having an average unit formula $$R_c H_d SiO_{(4-c-d)/2}$$

wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a), (c) from 100 to 500 parts by weight of alumina powder, and (d) a catalytic quantity of a platinum-group compound as a catalyst.

DETAILED DESCRIPTION OF THE INVENTION

Component (a) is crosslinked with component (b) in the presence of component (d) as a catalyst to form an elastomer. Examples of the silicon-bonded R in the average unit formula are monovalent hydrocarbon radicals such as alkyl radicals, such as methyl, ethyl, propyl, butyl, octyl, and cyclohexyl; aryl radicals such as phenyl and tolyl and halogenated monovalent hydrocarbon radicals such as halogenated alkyl radicals such as 3-chloropropyl and 3,3,3-trifluoropropyl. Examples of R' are monovalent aliphatically unsaturated hydrocarbon radicals such as vinyl, allyl, and 3-butenyl. The silicon atoms of this component may be bonded to extremely small amounts of other substituents such as hydroxyl and alkoxy in addition to R and R'. Example of siloxane units comprising this component are RR'SiO$_{2/2}$, R$_2$SiO$_{2/2}$, RSiO$_{3/2}$, R'SiO$_{3/2}$, R$_2$R'SiO$_{1/2}$, RR$_2$'SiO$_{1/2}$, and SiO$_{4/2}$. The molecular configuration of this component is usually straight chain; however, it may be partially branched. The aliphatically unsaturated hydrocarbon radicals of R' may be present at the molecular chain ends or as side chains or at both locations. These R' are preferably present at the terminals from the standpoints of improved postcure mechanical properties. In a single molecule, R and R' may each consist of a single type or may each consist of a mixture of two or more types. The polyorganosiloxanes of this composition may comprise a single type or a mixture of two or more types. Both the crosslinking density which can be varied by appropriately varying the mixing ratio of relatively low viscous polyorganosiloxane and relatively high viscous polyorganosiloxane and the quantity of inorganic filler are appropriately selected to satisfy the hardness specified for the cured silicone rubber. The desired product hardness can thus be advantageously obtained. The viscosity of the polyorganosiloxane, regardless of whether it is a single type or a mixture of two or more types, is usually 0.1 to 100 Pa·s and preferable 0.2 to 50 Pa·s on average at 25° C.

Component (b) plays the role of crosslinking agent for component (a). Examples of the R groups directly bonded to silicon in this component are the same as for the R groups of component (a) and the R groups may be identical to the R groups of component (a). Examples of the siloxane units constituting this component are $RHSiO_{2/2}$, $R_2SiO_{2/2}$, $RSiO_{3/2}$, $HSiO_{3/2}$, $R_3SiO_{1/2}$, $R_2HSiO_{1/2}$, and $SiO_{4/2}$.

This polyorganohydrogensiloxane may take the form of a straight chain, branched chain, network, or ring; however, a straight chain or ring is preferred. The R groups in each molecule may be a single type or a mixture of two or more types. The polyorganohydrogensiloxane may be a single type or a mixture of two or more types. The silicon-bonded hydrogen atoms may be located at the molecular chain ends or along the chain or at both of these two locations. In order to cure component (a), the quantity of silicon-bonded hydrogen atoms must be 0.5 to 10 equivalents per 1 equivalent of the aliphatically unsaturated hydrocarbon radical of component (a). The viscosity of component (b) is 0.0007 to 5 Pa·s at 25° C.

The alumina powder comprising component (c) is expressed by the chemical formula $Al_2O_3$ and is indispensable for imparting a high thermal conductivity and moderate viscosity and thickness to the silicone rubber composition of this invention. A typical alumina which is useful in this invention is the well-known calcined alumina(α-alumina) which can be produced by grinding a pulverizing the α-alumina produced by the heat treatment of aluminum hydroxide at elevated temperatures.

The alumina to be used in the composition of this invention is desirably in the form of an extremely fine powder such as a particle size of $\leq 50\mu$. The quantity of addition is 100 to 500 parts by weight and preferable 200 to 350 parts by weight per 100 parts by weight of component (a). When this quantity is less than 100 parts by weight, the resulting radiating sheet does not exhibit an adequate thermal conductivity. On the other hand, when the abovementioned quantity exceed 500 parts by weight, the resulting silicone rubber composition does not exhibit a satisfactory fluidity and, moreover, the vulcanized silicone rubber sheet suffers from degraded mechanical properties.

The platinum-group compound catalyst to be used by the method of this invention as component (d) is a catalyst for the addition reaction of the silicon-bonded aliphatically unsaturated hydrocarbon radicals in component (a) with the silicon-bonded hydrogen atoms of component (b). The platinum-group compound as defined in this text is the individual platinum group metal and its compounds. It includes extremely fine platinum powder, extremely fine platinum powder adsorbed on a carbon powder carrier, chloroplatinic acid, alcohol-modified products of chloroplatinic acid, platinum chelates, chloroplatinic acid-olefin coordination products, chloroplatinic acid-vinylsiloxane coordination products, and similar metal compounds of palladium, rhodium, iridium, ruthenium, and osmium. Of these catalysts, platinum compound catalysts are preferred. The quantity of addition of platinum-group compound catalyst is 1 to 800 ppm as platinum-group metal based on the combined quantities of components (a) to (c).

The fluid silicone rubber to be used by the method of this invention can be produced by blending the above-mentioned four components (a), (b), (c), and (d) to homogeneity. The mixer to be employed is arbitrary as long as the powder can be poured into and mixed with the liquid; however, it is preferable that the mixture be agitated under high shear forces. Because a mixture of components (a), (b), and (d) immediately begins to cure as soon as these components are mixed with each other, these three components should be mixed with each other immediately before molding. An addition-reaction inhibitor such as an organonitrogen compound, acetylene compound, or tin compound may be added to the above-mentioned composition to suppress the above-mentioned curing reaction from the standpoint of ease of operation. As necessary, an additional thermally conductive filler such as zinc oxide, and boron nitride and other materials such as fine quartz powder, reinforcing silica fillers, heat stabilizers, flame retardants, or pigments can be added.

The network insulating material includes woven fabrics, knits, nonwoven fabrics, and laminated products of these materials and may be any type as long as the material exhibits electric insulation. However, it should exhibit a good thermal conductivity and also exhibit a heat resistance in balance with the heat resistance of the silicone rubber. Examples are glass fibers, asbestos, and silicon carbide fibers.

When the fluid silicone rubber composition composed of the above-mentioned components (a) through (d) is coated on a network insulating material and then cured at room or elevated temperature, an electrically insulating and thermally radiating rubber sheet is produced.

The fluid silicone rubber composition is preferably coated on both surfaces of the network insulating material. The coating method is arbitrary; however, a preferred coating method is a doctor-blade method in which coating is carried out under an extremely low pressure.

The fluid silicone rubber composition can be efficiently cured at elevated temperatures of 70° to 180° C. by either press vulcanization or hot-air vulcanization; however, in a preferred process a fluid silicone rubber composition which has been coated by a doctor blade is passed continuously through a heating oven.

When the addition of a small quantity of an organic solvent which exhibits an affinity for component (a) or (b) prior to coating the fluid silicone rubber on the network insulating material, doctor-blade coating can be smoothly carried out. Moreover, dip coating can also be smoothly carried so that the electrical insulating and thermal radiating rubber sheet can be manufactured with only a few immersions and a subsequent curing process. The organic solvent to be used includes toluene, xylene, halogenated hydrocarbons such as 3,3,3-trichloroethane and tetrachloroethylene, acetone, and methyl ethyl ketone and the quantity should be 1 to 20 wt% of the silicone rubber composition.

When a small quantity of the above-mentioned organic solvent is added to the silicone rubber composition, the silicone rubber composition would be heated at a relatively low temperature in order to evaporate the organic solvent and then completely cured by heating at a higher temperature.

According to the method of production of this invention, an electric insulating and thermal radiating rubber sheet of higher strength can be efficiently manufactured.

The electrically insulating and thermally radiating rubber sheet produced by the production method of this invention not only exhibits high strength because the silicone rubber has thoroughly penetrated into and become unified with the network insulating material, but also does not suffer from peeling of the silicone rubber from the network insulating material even with repeated flexural loading of the sheet. Also, its thermal radiative property does not decline even in the presence of the network insulating material. These characteristics can be further improved by the preliminary addition of a small amount of an organic solvent to the fluid silicone rubber composition.

The electrically insulating and thermally radiating rubber sheet produced by the method of this invention may be optionally cut into pieces of the desired shape and then installed between the heat-producing electronic component and a radiator fin (or metal radiator plate) with the result that the heat generated by the electronic component can be efficiently radiated.

This invention will be explained using demonstrational example. "Parts" in the examples denotes "parts by weight" and the physical properties such as the viscosity were all measured at 25° C.

The viscosity was measured using a BH rotary viscometer and the tensile strength, volume resistivity, and breakdown strength were measure by the methods of JIS K 6301. The dissolution time as defined in this text is the time required for the dissolution to homogeneity of the silicone rubber composition. The thermal resistivity was measured by attaching a TO-3 power transistor to a radiator via an insulating and radiating rubber sheet of this invention, and the units °C./w are degree centigrade per watt.

EXAMPLE 1

120 parts of a methylphenylvinylsilyl-terminated dimethylsiloxane-methylvinylsiloxane methylphenylsiloxane copolymer (siloxane unit monomer molar ratio 94.7:0.3:5.0 respectively dimethylsiloxane units:methylvinylsiloxane units:methylphenylsiloxane units; viscosity, 10 Pa·s) was combined with 250 parts α-alumina (2.2μ average particle size), 1.5 parts tetramethyltetrahydrogencyclotetrasiloxane as the crosslinking agent, choroplatinic acid ($H_2PtCl_6 \cdot 6H_2O$, 11 ppm platinum based on the whole quantity), and 0.06 part benzotriazole as the addition-reaction inhibitor. The resulting mixture was blended to homogeneity to obtain a fluid silicone rubber composition (I) viscosity, 1,500 Pa·s).

The fluid silicone rubber composition (I) was coated, either directly or optionally diluted with toluene, on one side of a glass cloth (thickness, 0.2 mm) using a doctor blade and then was continuously moved through a heating oven at 130° C. for hot-air vulcanization with a residence time of 5 minutes. Composition (I) was then similarly coated on the other side of the glass cloth and subsequently hot-air vulcanized. The composition containing toluene was heated by warm air at 30° to 40° C. in order to evaporate the toluene and then hot-air vulcanized at 130° C. As comparison Example 1, a conventional insulating and radiating rubber sheet was produced by pouring fluid silicone rubber composition (I) into a 0.31 mm deep mold, smoothing the surface with a doctor blade and subsequently hot-air vulcanizing at 130° C. for 5 minutes.

The data on the production method and the properties of the insulating and radiating rubber sheet are both reported in Table 1.

TABLE 1

|  | This Invention Example 1 |  | Comparison Example 1 |
|---|---|---|---|
| Fluid silicone rubber composition (I) (parts) | 100 | 97 | 100 |
| Toluene (parts) | — | 3 | — |
| Viscosity, Pa · s | 1100 | 100 | 1100 |
| Dissolution time (hrs) | — | instant | — |
| Coatability | good | good | — |
| Rubber sheet thickness (mm) | 0.30 | 0.30 | 0.30 |
| Coating operations (times per surface) | 1 | 2 | — |
| Tensile strength (kg/25 mm width) | 30 | 31 | 0.10 |
| Volume resistivity (ohm-cm) | $2.0 \times 10^{14}$ | $2.2 \times 10^{14}$ | $1.8 \times 10^{14}$ |
| Breakdown voltage (kV) | 8 | 9 | 8 |
| Thermal resistivity °C./w | 0.85 | 0.82 | 0.78 |

EXAMPLE 2

A dimethylvinylsilyl-terminated polydimethylsiloxane (120 parts; vinyl group content, 0.30 wt%; viscosity, 2 Pa·s) was combined and then kneaded with a fumed silica (20 parts; BET surface area, 200 m²/g) and hexamethyldisilazane (7 parts) at an elevated temperature. The resulting base compound was combined with α-alumina (250 parts; average particle size, 2.2μ), a polymethylhydrogensiloxane (4.6 parts; viscosity, 0.007 Pa·s) with the general formula

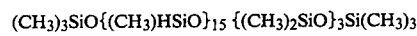

$(CH_3)_3SiO\{(CH_3)HSiO\}_{15}\{(CH_3)_2SiO\}_3Si(CH_3)_3$ as the crosslinker, methylvinylsiloxane-chloroplatinic acid complex (20 ppm platinum based on the whole quantity) as the addition-reaction catalyst and 3,5-dimethyl-1-hexyn-3-ol as the addition-reaction inhibitor. The resulting mixture was blended to homogeneity in order to obtain fluid silicone rubber composition (II) (viscosity, 3000 Pa·s).

The resulting fluid silicone rubber composition (II) was coated, directly or optionally diluted with xylene, on one surface of a glass cloth (thickness, 0.1 mm) using a doctor blade and then continuously moved through a heating oven for hot-air vulcanization at 150° C. with a residence time of 3 minutes. Composition (I) was then coated on the other surface of the glass cloth by the same method as above and subsequently hot-air vulcanized. The composition containing xylene was treated with warm air at 30° to 40° C. in order to evaporate the xylene and was then hot-air vulcanized at 150° C. For the Comparison Example 2, a conventional insulating and radiating rubber sheet was manufactured by pouring fluid silicone rubber composition (II) into a 0.21 mm deep mold, smoothing the surface with a doctor blade and then hot-air vulcanizing at 150° C. for 3 minutes. The data on the production process and properties of the electrically insulating and thermally radiating rubber sheet products are reported in Table 2.

TABLE 2

|  | This Invention Example 2 |  | Comparison Example 2 |
|---|---|---|---|
| Fluid silicone rubber composition (II) (parts) | 100 | 95 | 90 | 100 |
| Xylene (parts) | — | 5 | 10 | — |
| Viscosity, Pa · s | 3000 | 200 | 100 | 3000 |

TABLE 2-continued

|  | This Invention | | | Comparison Example 2 |
|---|---|---|---|---|
|  | Example 2 | | | |
| Dissolution time (hrs) | — | instant | instant | — |
| Coatability | good | good | good | — |
| Rubber sheet thickness (mm) | 0.20 | 0.20 | 0.20 | 0.20 |
| Coating operations (times per surface) | 1 | 2 | 3 | — |
| Tensile strength (kg/25 mm width) | 20 | 21 | 19 | 0.28 |
| Volume resistivity (ohm-cm) | $6.0 \times 10^{14}$ | $6.5 \times 10^{14}$ | $6.2 \times 10^{14}$ | $5.8 \times 10^{14}$ |
| Breakdown voltage (kV) | 8 | 9 | 9 | 8 |
| Thermal resistivity °C./w | 0.65 | 0.60 | 0.60 | 0.66 |

COMPARISON EXAMPLES 3-5

An polyorganosiloxane gum (100 parts; degree of polymerization, 5000; dimethylsiloxane units, 99.84 mol %; methylvinylsiloxane units, 0.16 mol %) was combined with a hydroxyl terminated polydimethylsiloxane (7.0 parts; viscosity at 25° C., 0.00004 m²/s) and a fumed silica (20 parts; BET surface area, 200 m²/g) as a reinforcing filler. The resulting mixture was heated while being kneaded. The mixture was combined with α-alumina (250 parts; average particle size, 2.2μ) and benzoyl peroxide (4.0 parts) as the vulcanizing agent and then kneaded on a two-roll to homogeneity. A nonfluid (solid) silicone rubber composition (III) was thus produced.

Since nonfluid (solid) silicone rubber composition (III) could not be directly coated on a glass cloth (thickness, 0.1 mm) using a doctor blade, it was dissolved in and diluted with xylene. The resulting solution was coated on a glass cloth by the method of Example 1 and subsequently hot-air vulcanized to obtain an insulating and radiating rubber sheet. The data on the production process and the properties of the insulating and radiating rubber sheet product are shown in Table 3.

As demonstrated earlier in the examples, an insulating and radiating rubber sheet with high strength can be simply and effectively manufactured by the method of this invention.

TABLE 3

| | Comparison Example 3 | Comparison Example 4 | Comparison Example 5 |
|---|---|---|---|
| Non fluid silicone rubber composition (III) (parts) | 100 | 50 | 30 |
| Xylene (parts) | — | 50 | 70 |
| Viscosity, Pa · s | — | 10000 | 200 |
| Dissolution time (hrs) | — | 5-10* | 5* |
| Coatability | poor | poor | good |
| Rubber sheet thickness (mm) | rubber sheet could not be formed | rubber sheet could not be formed | 0.20 |
| Coating operations (times per surface) | — | — | 6 |
| Tensile strength (kg/25 mm width) | — | — | 18 |
| Volume resistivity (ohm-cm) | — | — | $7.0 \times 10^{14}$ |
| Breakdown voltage (kV) | — | — | 8 |
| Thermal resistivity °C./w | — | — | 0.62 |

*The following problem occurred: in attempting the dissolution of the above-mentioned composition (III), the metal stirring blade was significantly abraded due to the lengthy agitation process with the result that the entire solution became blackish.

EXAMPLE 3

A fluid silicone rubber composition (IV) and then an electrically insulating and thermally radiating rubber sheet were produced by the methods of Example 1 with the exception that a dimethylvinylsilyl-terminated polymethyl(3,3,3-trifluoro-propylsiloxane (viscosity, 10 Pa·s) was used instead of the dimethylsiloxane-methylvinylsiloxane-methylphenylsiloxane copolymer of Example 1 and methyl ethyl ketone was used instead of toluene.

The data on the production process and the properties of the electrically insulating and thermally radiating rubber sheet products are reported in Table 4.

TABLE 4

|  | This Invention Example 3 | |
|---|---|---|
| Fluid silicone rubber composition (IV) (parts) | 100 | 95 |
| Methyl ethyl ketone (parts) | — | 5 |
| Viscosity, Pa · s | 1200 | 190 |
| Dissolution time (hrs) | — | instant |
| Coatability | good | good |
| Rubber sheet thickness (mm) | 0.30 | 0.30 |
| Coating operations (times per surface) | 1 | 2 |
| Tensile strength (kg/25 mm width) | 29 | 31 |
| Volume resistivity (ohm-cm) | $2.2 \times 10^{14}$ | $2.3 \times 10^{14}$ |
| Breakdown voltage (kV) | 8 | 8 |
| Thermal resistivity °C./w | 0.84 | 0.82 |

That which is claimed:

1. A method for manufacturing a rubber sheet which is electrically insulating and thermally radiating,
   comprising coating a network insulating material with a fluid silicone rubber composition and then curing said composition, where the fluid silicone rubber composition consists essentially of
   (a) 100 parts by weight of a polyorganosiloxane having a viscosity at 25° C. of from 0.1 to 100 Pa·s and having an average unit formula $R_a R_b' SiO_{(4-a-b)/2}$ wherein each R represents a monovalent hydrocarbon radical free of aliphatic unsaturation or a halogenated monovalent hydrocarbon radical free of aliphatic unsaturation, each R' represents a monovalent aliphatically unsaturated hydrocarbon radical, a has a value from 1.90 to 2.05, b has a value from 0.0005 to 0.1, and the sum of a+b has a value from 1.91 to 2.06,
   (b) a polyorganohydrogensiloxane having a viscosity at 25° C. of 0.0007 to 5 Pa·s and having an average unit formula $R_cH_dSiO_{(4-c-d)/2}$ wherein R is defined above, the sum of c+d has a value of 1.001 to 3, there is at least two silicon-bonded hydrogen atoms per molecule, and said polyorganohydrogensiloxane is present in an amount such that there are 0.5 to 10 equivalents of silicon-bonded hydrogen atoms per equivalent of aliphatically unsaturated hydrocarbon radical in (a), (c) from 100 to 500 parts by weight of alumina powder, and (d) a catalytic quantity of a platinum-group compound as a catalyst.

2. The method in accordance with claim 1 in which the polyorganosiloxane of (a) has viscosity in the range of 0.2 to 50 Pa·s, the alumina powder is present in an amount of 200 to 350 parts by weight, and (d) is a platinum-compound and is present in an amount such that the platinum metal is 1 to 800 ppm based on (a), (b), and (c).

3. The method in accordance with claim 2 in which the polyorganosiloxane of (a) is a methylphenylvinylsilyl terminated copolymer of dimethylsiloxane units, methylvinylsiloxane units, and methylphenylsiloxane units.

4. The method in accordance with claim 2 in which the polyorganosiloxane of (a) is a dimethylvinylsilyl terminated copolymer of dimethylsiloxane units and methylvinylsiloxane units.

5. The method in accordance with claim 2 in which the polyorganosiloxane of (a) is a dimethylvinylsilyl terminated polymethyl(3,3,3-trifluoropropyl)siloxane.

6. An electrically insulating and thermally radiating rubber sheet prepared in accordance with the method of claim 1.

7. An electrically insulating and thermally radiating rubber sheet prepared in accordance with the method of claim 2.

8. An electrically insulating and thermally radiating rubber sheet prepared in accordance with the method of claim 3.

9. An electrically insulating and thermally radiating rubber sheet prepared in accordance with the method of claim 4.

10. An electrically insulating and thermally radiating rubber sheet prepared in accordance with the method of claim 5.

* * * * *

UNITED STATES PATENT AND TRADEMARK OFFICE
CERTIFICATE OF CORRECTION

PATENT NO. : 4,486,495
DATED : 12/4/84
INVENTOR(S) : Takao Matsushita and Koji Shimizu It is certified that error appears in the above-identified patent and that said Letters Patent is hereby corrected as shown below:

In Column 3, line 3, the word "ble" should read "bly".

In Column 3, line 33, the word "a" should read "or".

In Column 3, line 36, the word "desirably" should read "desirable".

In Column 3, line 38, the word "preferable" should read "preferably".

In Column 3, line 43, the word "abovementioned" should read "above mentioned".

In Column 5, line 49, the word "Pa.s)" should read "Pa.s".

In Column 7, lines 51, 52, 53, the words "Comparison Example 3" should be moved one column to the right.

In Column 8, lines 2, 3, 4, the words "Comparison Example 3" should be moved one column to the right.

In Column 9, line 4, the word "is" should read "are".

Signed and Sealed this

Twenty-first Day of January 1986

[SEAL]

Attest:

DONALD J. QUIGG

*Attesting Officer*   *Commissioner of Patents and Trademarks*